US010852406B2

(12) United States Patent
Honda et al.

(10) Patent No.: US 10,852,406 B2
(45) Date of Patent: Dec. 1, 2020

(54) TERMINAL MANAGEMENT APPARATUS AND TERMINAL MANAGEMENT SYSTEM

(71) Applicant: FUJI XEROX CO., LTD., Tokyo (JP)

(72) Inventors: Hiroshi Honda, Kanagawa (JP); Eiji Nishi, Kanagawa (JP); Yoshihiro Sekine, Kanagawa (JP); Kenji Kuroishi, Kanagawa (JP); Hiroshi Mikuriya, Kanagawa (JP); Takeshi Furuya, Kanagawa (JP); Keita Sakakura, Kanagawa (JP); Ryuichi Ishizuka, Tokyo (JP)

(73) Assignee: FUJI XEROX CO., LTD., Tokyo (JP)

( * ) Notice: Subject to any disclaimer, the term of this patent is extended or adjusted under 35 U.S.C. 154(b) by 328 days.

(21) Appl. No.: 15/893,820

(22) Filed: Feb. 12, 2018

(65) Prior Publication Data

US 2018/0275262 A1 Sep. 27, 2018

(30) Foreign Application Priority Data

Mar. 24, 2017 (JP) .................................. 2017-058580

(51) Int. Cl.
*G01S 13/00* (2006.01)
*G01V 3/12* (2006.01)
(Continued)

(52) U.S. Cl.
CPC .......... *G01S 13/003* (2013.01); *G01S 13/867* (2013.01); *G01V 3/12* (2013.01); *G01V 8/10* (2013.01);
(Continued)

(58) Field of Classification Search
CPC ....... H04W 4/80; H04W 4/023; H04W 84/12; H04W 4/33; H04W 36/30; H04W 4/02;
(Continued)

(56) References Cited

U.S. PATENT DOCUMENTS 7,275,101 B2 * 9/2007 Katayama ............ G06Q 10/087
347/19
9,684,826 B2 * 6/2017 Dubuque ........... G06K 9/00671
(Continued)

FOREIGN PATENT DOCUMENTS

JP 2009-198454 A 9/2009

*Primary Examiner* — Olumide Ajibade Akonai
(74) *Attorney, Agent, or Firm* — Sughrue Mion, PLLC

(57) ABSTRACT

A terminal management apparatus includes a radio wave intensity information obtaining unit that obtains radio wave intensity information indicating intensity of radio waves transmitted from a terminal device being managed; a radio wave intensity examination unit that examines a change in intensity of radio waves transmitted from the terminal device, on the basis of the obtained radio wave intensity information; an arrangement information obtaining unit that obtains arrangement information of an item installed indoors; a terminal information holding unit that holds information on the terminal device; and a disturbance determination unit that determines presence and type of radio disturbance, on the basis of a pattern of the change in intensity of radio waves detected by the radio wave intensity examination unit, the arrangement information obtained by the arrangement information obtaining unit, and the information on the terminal device held by the terminal information holding unit.

7 Claims, 8 Drawing Sheets

(51) Int. Cl.
  *G01S 13/86* (2006.01)
  *G01V 8/10* (2006.01)
  *H04W 64/00* (2009.01)
  *H04W 88/02* (2009.01)
  *G01S 5/02* (2010.01)

(52) U.S. Cl.
  CPC .......... *H04W 64/00* (2013.01); *G01S 5/0252* (2013.01); *H04W 88/02* (2013.01)

(58) Field of Classification Search
  CPC ..... H04W 4/021; H04W 4/029; H04W 84/18; H04W 4/025; H04W 64/00; H04W 36/32; H04W 64/003; H04W 24/10; H04W 28/0236; G01S 5/14; G01S 5/0252; G01S 5/0257; G01S 5/0273; G01S 5/0215; G01S 11/06; G01S 5/0284; H04L 12/2823; H04L 67/18
  See application file for complete search history.

(56) References Cited

U.S. PATENT DOCUMENTS

| | | | |
|---|---|---|---|
| 2007/0247286 A1* | 10/2007 | Drago | G06K 19/0716 340/10.4 |
| 2009/0213009 A1 | 8/2009 | Ishiwatari et al. | |
| 2015/0133173 A1* | 5/2015 | Edge | G01S 1/66 455/456.6 |
| 2016/0088424 A1* | 3/2016 | Polo | H04W 4/80 455/41.1 |
| 2017/0220985 A1* | 8/2017 | White | G06Q 10/08 |
| 2017/0272914 A1* | 9/2017 | Saito | H04W 4/029 |
| 2018/0070212 A1* | 3/2018 | De Lorenzo | H04W 4/027 |

* cited by examiner

TERMINAL MANAGEMENT APPARATUS AND TERMINAL MANAGEMENT SYSTEM

CROSS-REFERENCE TO RELATED APPLICATIONS

This application is based on and claims priority under 35 USC 119 from Japanese Patent Application No. 2017-058580 filed Mar. 24, 2017.

BACKGROUND (i) Technical Field

The present invention relates to a terminal management apparatus and a terminal management system.

(ii) Related Art

There are systems that connect multiple terminal devices and a server via a network of wireless links in a specific area such as a room and manages the terminal devices. To perform wireless communication between each terminal device and the server device, the intensity of radio waves received by a radio wave receiver (access point) needs to be greater than or equal to certain intensity. This radio wave intensity is affected not only by the distance between the radio wave transmitter and the radio wave receiver, but also by the arrangement of a shielding object positioned between the transmitter and the receiver.

Various factors cause reduction of the intensity of radio waves received by the receiver. In order to maintain the system, if the reception intensity of radio waves transmitted from a specific terminal device drops, it is necessary to specify the cause of the drop.

SUMMARY

According to an aspect of the invention, there is provided a terminal management apparatus including a radio wave intensity information obtaining unit, a radio wave intensity examination unit, an arrangement information obtaining unit, a terminal information holding unit, and a disturbance determination unit. The radio wave intensity information obtaining unit obtains radio wave intensity information indicating intensity of radio waves transmitted from a terminal device being managed. The radio wave intensity examination unit examines a change in intensity of radio waves transmitted from the terminal device, on the basis of the radio wave intensity information obtained by the radio wave intensity information obtaining unit. The arrangement information obtaining unit obtains arrangement information of an item installed indoors. The terminal information holding unit holds information on the terminal device. The disturbance determination unit determines presence and type of radio disturbance, on the basis of a pattern of the change in intensity of radio waves detected by the radio wave intensity examination unit, the arrangement information obtained by the arrangement information obtaining unit, and the information on the terminal device held by the terminal information holding unit.

BRIEF DESCRIPTION OF THE DRAWINGS

An exemplary embodiment of the present invention will be described in detail based on the following figures, wherein:

FIG. 7A illustrates how sensor data is obtained using wireless communication, and FIG. 7B illustrates how sensor data is obtained via the mobile terminal device;

DETAILED DESCRIPTION

Hereinafter, an exemplary embodiment of the present invention will be described in detail with reference to the accompanying drawings.

System to which Exemplary Embodiment is Applied

Figure 1:
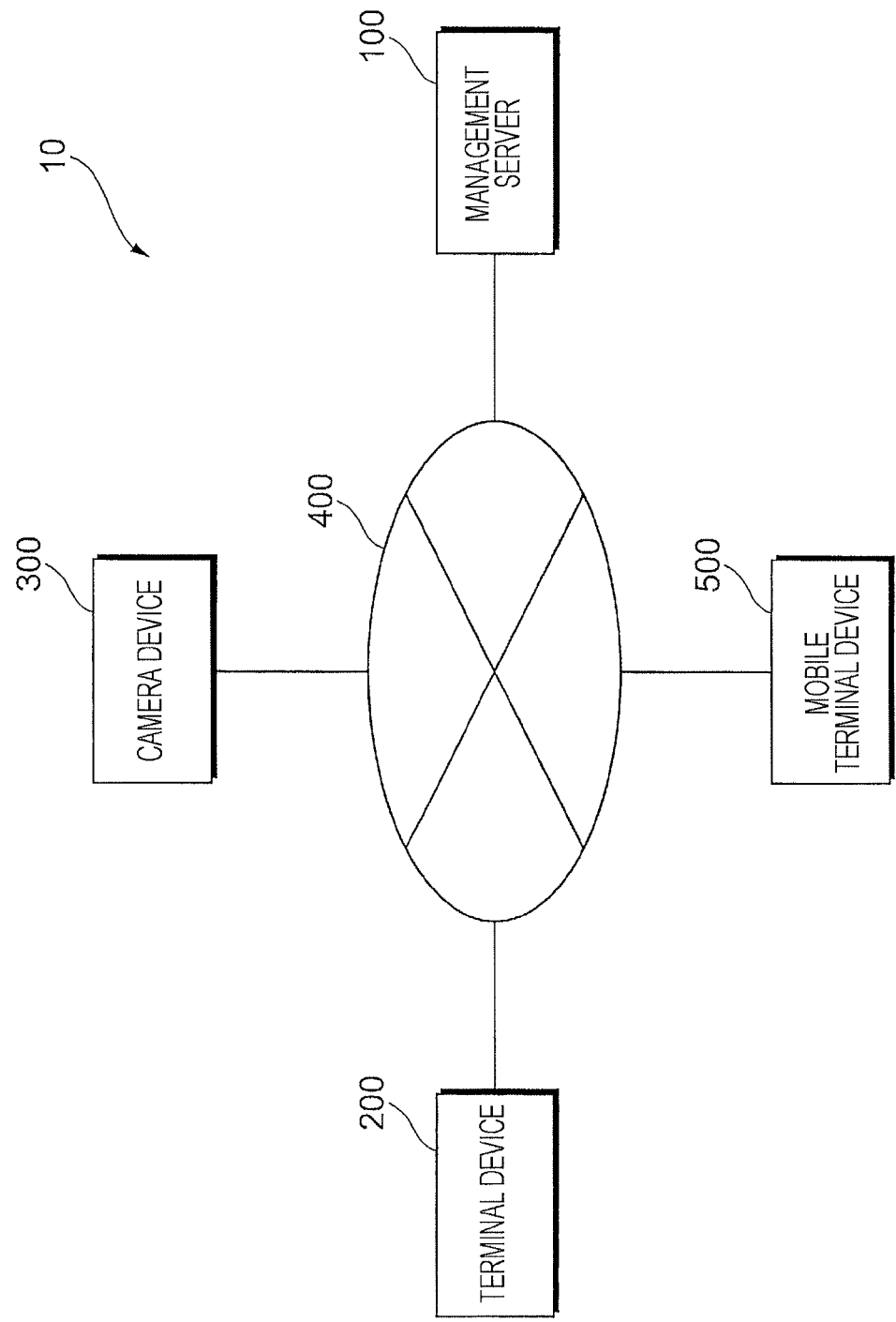
FIG. 1 is a diagram illustrating the overall configuration of a terminal management system according to an exemplary embodiment.

FIG. 1 is a diagram illustrating the overall configuration of a terminal management system according to the exemplary embodiment. A terminal management system 10 illustrated in FIG. 1 includes a management server 100, a terminal device 200, which is a device being managed, a camera device 300, and a mobile terminal device 500. The management server 100, the terminal device 200, and the camera device 300 are connected via a network 400. Although not illustrated in FIG. 1, the management server 100 itself may be connected to another server (external server) via the network 400. In this case, the management server 100 functions as a so-called edge server in an information system including other servers on a network. The camera device 300 may be treated as one type of terminal device 200, which will be described in detail later.

The management server 100, the terminal device 200, and the mobile terminal device 500 may be connected via the network 400, or may be connected by a dedicated link, not through the network 400. For example, the management server 100 and the mobile terminal device 500 may be connected via a wireless communication link using short-distance wireless communication, such as near-field radio communication (NFC) or Bluetooth (registered trademark). In doing so, when the mobile terminal device 500 approaches the management server 100 to a certain distance, data exchange is performed between the management server 100 and the mobile terminal device 500.

The management server 100 is an example of a terminal management apparatus that manages the terminal device 200 installed indoors. The management server 100 is realized by various information processing apparatuses with a communication function, besides personal computers and server machines. In the exemplary embodiment, for example, the case will be described in which an image processing apparatus, namely, a multifunctional peripheral, which is provided with a photocopy function, an image reading function, a print function, and a FAX communication function, and which is additionally provided with a communication function for connecting to the network 400 and a communication function for connecting to the mobile terminal device 500 is used as the management server 100.

The management server 100 manages the terminal device 200, and receives and holds information from the terminal device 200. Additionally, the management server 100 controls the camera device 300 to capture an image of the interior of a room where the camera device 300 is installed, and obtains the image. The management server 100 has a network interface for connecting to a network link.

The terminal device 200 is an electronic device including an information obtaining unit that obtains various types of information, and a communication function for performing communication via the network 400. The information obtaining unit is a unit that obtains various types of environment information as physical amounts, such as temperature, humidity, illuminance, and acceleration. For example, various sensors that obtain these physical amounts are used as the information obtaining unit. That is, the terminal device 200 is a so-called sensor device (sensor terminal). The terminal device 200 is provided with a specific sensor in accordance with the type of the terminal device 200. Using the communication function, the terminal device 200 transmits information obtained by the sensor to the management server 100 via the network 400. The terminal device 200 establishes a connection with the network 400 mainly via a wireless link. The type of information obtaining unit of each terminal device 200 is not limited to the same type, and multiple terminal devices 200 may include various information obtaining units and actuating units that are different from one terminal device 200 to another. Furthermore, one terminal device 200 may include multiple types of information obtaining units. In the exemplary embodiment, multiple terminal devices 200 are installed at various locations in accordance with information to obtain. Therefore, the physical positional relationship between the management server 100 and each terminal device 200 is different from one to another. In the exemplary embodiment, unlike the mobile terminal device 500, it is assumed that each terminal device 200 is fixed at a certain position or only move on a specific route.

The camera device 300 is an image obtaining unit installed as a so-called security camera or the like in a room where the management server 100 and the terminal device 200 are arranged. In the normal operation, the camera device 300 captures an image of the interior of the room, and stores the obtained image in a storage device such as a magnetic disk drive or the like. Additionally, the camera device 300 receives a control command from the management server 100, and transmits the captured image to the management server 100. In the exemplary embodiment, the camera device 300 is arranged such that the camera device 300 is able to capture an image of the entire area (managed area) such as a room where the management server 100 and the terminal device 200 are installed. Specifically, multiple camera devices 300 may be provided; an image of the entire managed area may be captured using a wide-angle lens; or it may be configured to capture an image of the entire managed area using a movable platform such that the image capturing direction is changeable. When the management server 100 is provided with a camera, the camera of the management server 100 may be used as one camera device 300. Communication between the camera device 300 and the management server 100 may be performed using a wireless link or a wired line.

The network 400 is not particularly limited, unless it is a communication network used in data communication between the management server 100 and the terminal device 200. Examples of the network 400 include a LAN, a wide area network (WAN), and the Internet. A communication link used in data communication is not limited to wired or wireless, as has been described above, and both wired and wireless links may be employed. The devices may be connected to one another via multiple networks or communication links.

The mobile terminal device 500 is a device that moves in an area (movement area) that at least partially overlaps a managed area. Specifically, when a managed area is a specific floor or a specific room in an office, the mobile terminal device 500 may be a device (so-called wearable device) carried or worn by an employee on the floor or in the room. The mobile terminal device 500 functions as a relay device that collects information on the terminal device 200, and, when the mobile terminal device 500 approaches the management server 100, transmits the collected information on the terminal device 200 to the management server 100. The mobile terminal device 500 may be provided with a sensor, and the mobile terminal device 500 itself may function as one terminal device 200.

Configuration of Management Server

Figure 2:
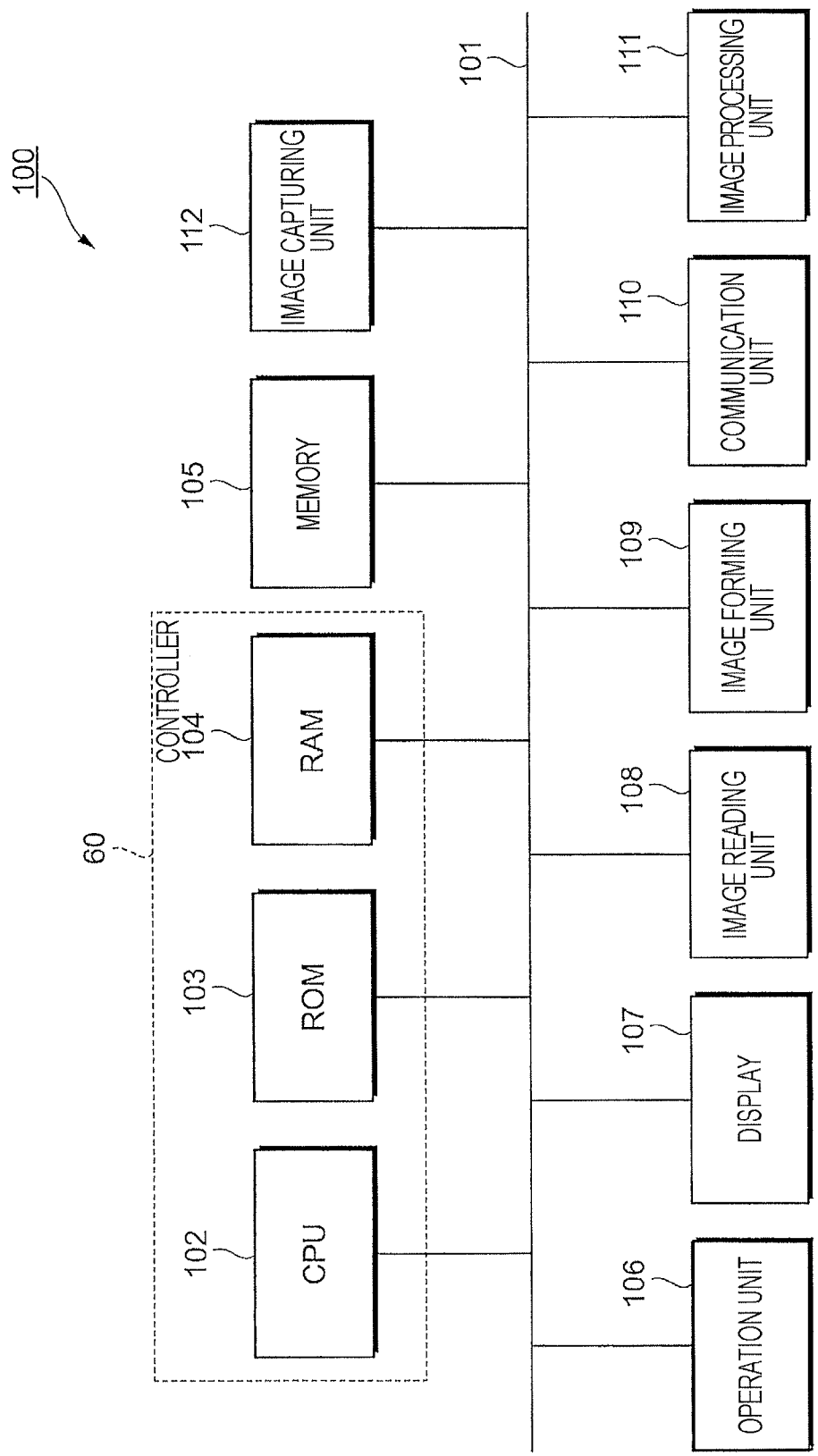
FIG. 2 is a diagram illustrating the functional configuration of a multifunctional peripheral serving as an example of a management server.

FIG. 2 is a diagram illustrating the functional configuration of a multifunctional peripheral serving as an example of the management server 100. In the configuration illustrated in FIG. 2, the management server 100 includes a central processing unit (CPU) 102 configuring a controller 60, read-only memory (ROM) 103, and random-access memory (RAM) 104. The management server 100 additionally includes memory 105, an operation unit 106, a display 107, an image reading unit 108, an image forming unit 109, a communication unit 110, an image processing unit 111, and an image capturing unit 112. These functional units are connected to a bus 101 and exchange data via the bus 101.

The operation unit 106 receives an operation performed by a user. The operation unit 106 includes, for example, a hardware key. The operation unit 106 also includes, for example, a touch sensor that outputs a control signal in accordance with a pressed position. The touch sensor and a liquid crystal display (LCD) configuring the later-described display 107 may be combined to configure a touchscreen.

The display 107 is an example of a display, and includes, for example, an LCD. The display 107 displays information regarding the management server 100 under control of the CPU 102. The display 107 additionally displays a menu screen to which the user refers when the user operates the management server 100. That is, the above-mentioned operation unit 106 and display 107 may be combined to function as a user interface unit of the management server 100.

The image reading unit 108 includes a so-called scanner device, which optically reads an image on a set document and generates a read image (image data). Examples of the image reading system include a charge coupled device (CCD) system where reflected light of light emitted from a light source to a document is reduced in size by a lens and received by CCDs, and a contact image sensor (CIS) system where reflected light of light beams emitted sequentially from light-emitting diode (LED) light sources to a document is received by CIS.

The image forming unit 109 is an example of an image forming unit, which forms an image based on image data using an image forming material on paper which is an example of a recording material. Examples of the system of forming an image on a recording material include an electrophotographic system that transfers toner attached to a photoconductor to a recording medium to form an image, and an inkjet system that discharges ink onto a recording medium to form an image.

The communication unit 110 includes a network interface for connecting to the terminal device 200 via the network 400. Although not illustrated in the drawings, for example, a network adapter for connecting to the network 400 using wired communication, a Wi-Fi (registered trademark) module serving as an access point for connecting to the network 400 using wireless communication, and a FAX module for connecting to a telephone link used in FAX communication are provided as network interfaces. A module for connecting to an external device using short-distance wireless communication such as NFC or Bluetooth (not illustrated) may be provided as the communication unit 110.

The image processing unit 111 includes a processor serving as an arithmetic operation unit and work memory, and applies image processing such as color correction or tone correction to an image represented by image data. The CPU 102 of the controller 60 may also serve as the processor, and the RAM 104 of the controller 60 may also serve as the work memory.

The image capturing unit 112 is a camera that includes a lens and an image sensor, and that obtains an image as electronic data. The image capturing unit 112 is provided in a multifunctional peripheral at such a position and a direction that an image of an operator who operates the multifunctional peripheral may be captured. An image of the operator captured by the image capturing unit 112 is analyzed and used for authentication or the like. In the exemplary embodiment, the image capturing unit 112 may be used as one camera device 300 illustrated in FIG. 1. In this case, under control of a later-described arrangement information obtaining unit 64, the image capturing unit 112 captures an image of the interior of a room.

The memory 105 is an example of memory, and includes, for example, a storage device such as a hard disk drive (HDD). The memory 105 stores image data such as a read image generated by the image reading unit 108. Furthermore, the memory 105 of the exemplary embodiment functions as a terminal information holding unit that holds information on the terminal device 200 being managed and also functions as an area information holding unit that holds information on an area being managed (such as the interior of a room or a floor) where the terminal device 200 being managed is arranged. Specifically, for example, the memory 105 stores information for connecting the management server 100 and the terminal device 200. The memory 105 additionally stores information (such as a map or a floor plan) indicating the layout of a managed area where the terminal device 200 being managed is arranged. The memory 105 also stores information indicating the distribution of intensity of radio waves received from each terminal device 200 in the managed area, which will be described in detail later.

Among the CPU 102, ROM 103, and RAM 104 configuring the controller 60, the ROM 103 stores a program executed by the CPU 102. The CPU 102 reads the program stored in the ROM 103, and, using the RAM 104 as a work area, executes the program. Alternatively, a program stored in the memory 105 may be loaded on the RAM 104, and the program loaded on the RAM 104 may be executed by the CPU 102. In response to execution of the program by the CPU 102, the above-described functional units of the management server 100 are controlled, and the following functions are realized.

Here, the program executed by the CPU 102 may be provided to the management server 100 in a state where the program is recorded on a computer-readable recording medium such as a magnetic recording medium (including a magnetic disk), an optical recording medium (including an optical disk), and semiconductor memory. Alternatively, the program executed by the CPU 102 may be provided to the management server 100 via a network such as the Internet.

Functional Configuration of Controller

Figure 3:
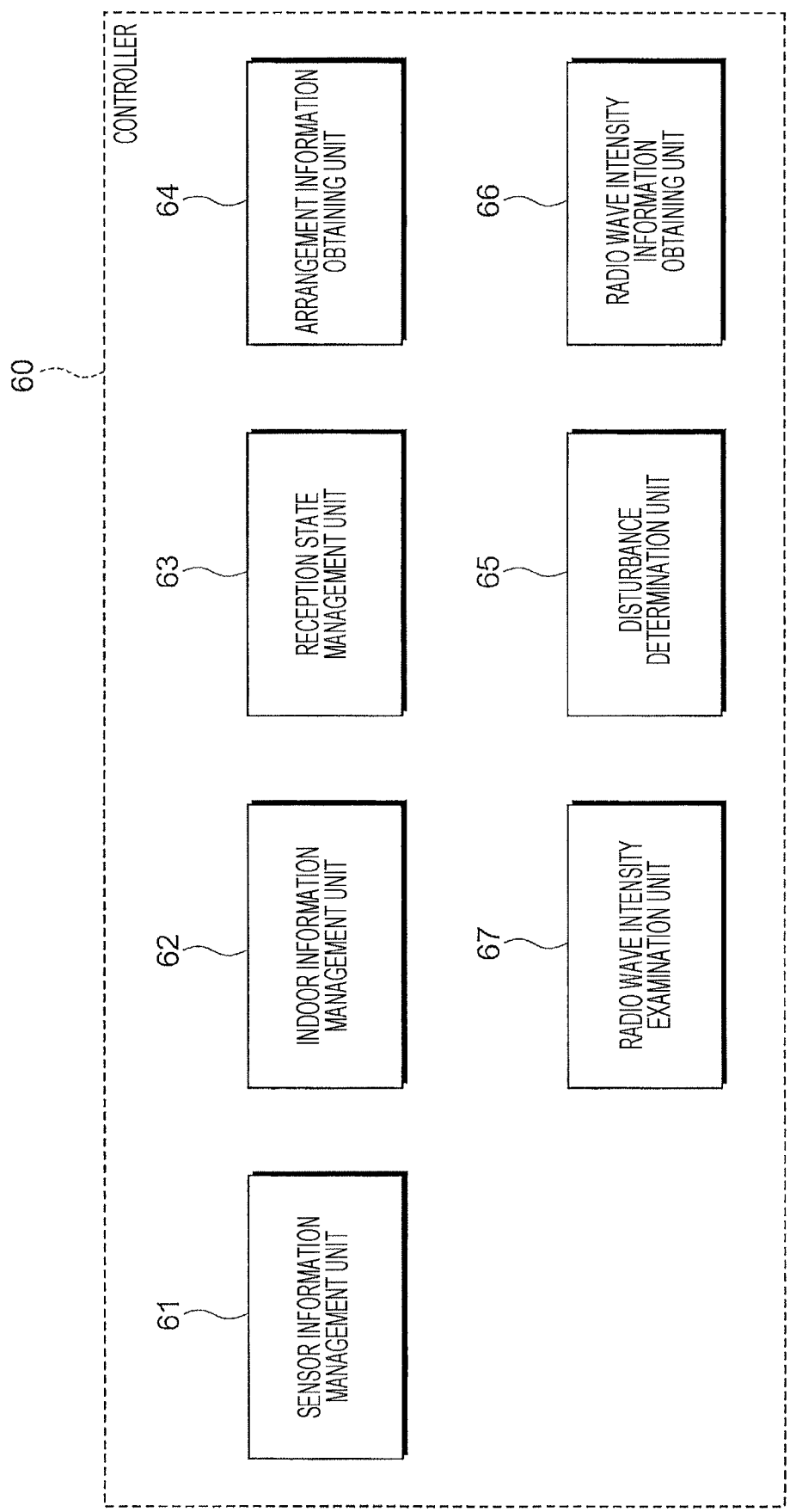
FIG. 3 is a diagram illustrating the functional configuration of a controller.

FIG. 3 is a diagram illustrating the functional configuration of the controller 60. In the controller 60, cooperation between software and hardware resources realizes the following functions as illustrated in FIG. 3: a sensor information management unit 61, an indoor information management unit 62, a reception state management unit 63, the arrangement information obtaining unit 64, a radio wave intensity information obtaining unit 65, a radio wave intensity examination unit 66, and a disturbance determination unit 67.

The sensor information management unit 61 receives sensor data received by the communication unit 110 and obtained by each terminal device 200, and stores and manages the sensor data according to each terminal device 200 in the memory 105. When it is set to perform processing on the obtained sensor data, the sensor information management unit 61 performs the set processing on the sensor data, and stores and manages the processed sensor data in the memory 105. When the management server 100 functions as an edge server of an information processing system including an external server, if a predetermined transmission condition is satisfied, sensor data stored in the memory 105 and obtained from each terminal device 200 is read, and, with the use of the communication unit 110, transferred to the external server.

The indoor information management unit 62 manages information on a managed area, which is stored in the memory 105. Information on a managed area is managed as, for example, information on coordinate values of an item and the terminal device 200 arranged in the managed area, with respect to coordinates set to a floor map such as the floor plan of the managed area. The indoor information management unit 62 stores in the memory 105 information on a shielding object (obstacle) arranged between the management server 100 and the terminal device 200, which is obtained by analyzing an image of the interior of the managed area captured by the camera device 300, and manages the information. When the position of an item or the terminal device 200 is changed or when a new item or a new terminal device 200 is added, the information stored in the memory 105 is updated on the basis of an operation performed on the operation unit 106 or update information obtained via the network 400 from an external device.

The reception state management unit 63 manages information on the reception state of radio waves transmitted from each terminal device 200 being managed. Information on the reception state of radio waves from each terminal device 200 is managed by associating the position and the radio wave intensity on the basis of the coordinates on a floor map or the like representing information on the managed area.

When a predetermined condition is satisfied, the arrangement information obtaining unit 64 outputs an image transmission command to the camera device 300, and obtains an image serving as arrangement information. Additionally, when the image capturing unit 112 of the management server 100, which is a multifunctional peripheral, is used as one camera device 300, an image is also obtained from the image capturing unit 112. A condition for obtaining an image is, for example, detection of a terminal device 200 whose radio wave reception state suddenly deteriorates, on the basis of the radio wave reception state of each terminal device 200 managed by the reception state management unit 63. Even when no change of the reception state is detected, an image may be periodically obtained to update the arrangement information.

The radio wave intensity information obtaining unit 65 obtains, from the communication unit 110, information on the intensity of radio waves received from each terminal device 200. The obtained information on the intensity of received radio waves is sent to the radio wave intensity examination unit 66 according to each terminal device 200, which is the transmission source.

The radio wave intensity examination unit 66 analyzes information on the intensity of received radio waves according to each terminal device 200, which is received from the radio wave intensity information obtaining unit 65, and examines any change of the intensity. For example, when the intensity of radio waves received from a specific terminal device 200 weakens, the radio wave intensity examination unit 66 extracts a change pattern, such as the pattern indicating that the intensity gradually weakens over a certain period of time (a predetermined period, such as a few days), the pattern indicating whether the intensity suddenly (abruptly) weakens at a certain time point, or the pattern indicating whether the intensity weakens at a certain rate, such as once in several times.

On the basis of the examination result obtained by the radio wave intensity examination unit 66, the disturbance determination unit 67 determines whether disturbance has occurred, which causes the change of intensity of received radio waves. For example, when the intensity of received radio waves gradually weakens over a certain period of time, it is determined that the change is due to exhaustion of a battery which is the power source of the terminal device 200. When the intensity suddenly weakens at a certain time point, it is determined that some kind of trouble causing disturbance occurred at that point. The cause of disturbance may be, for example, that a shielding object (obstacle) is placed between the management server 100 and the terminal device 200, or that the position of the terminal device 200 is changed, which leads to a positional relationship such that there is a shielding object between the management server 100 and the terminal device 200 and radio waves are difficult to reach. Additionally, radio waves transmitted from multiple terminal devices 200 interfere with each other to prevent the management server 100 from normally receiving the radio waves. Disturbance determination performed by the disturbance determination unit 67 will be described in detail later.

Functional Configuration of Terminal Device

Figure 4:
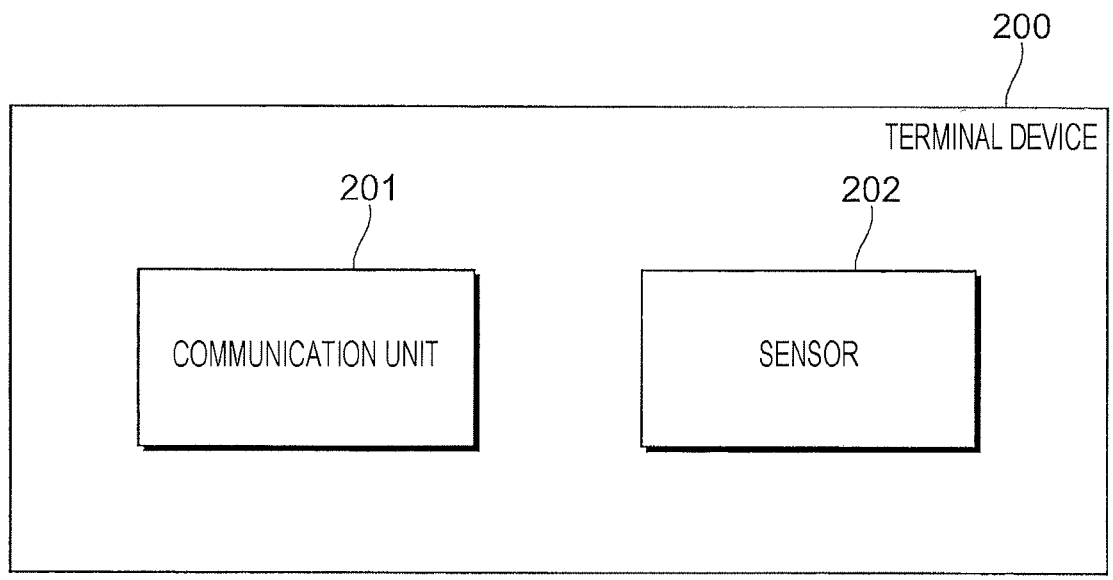
FIG. 4 is a diagram illustrating the functional configuration of a terminal device.

FIG. 4 is a diagram illustrating the functional configuration of the terminal device 200. As illustrated in FIG. 4, the terminal device 200 includes a communication unit 201, which is for connecting to the management server 100 via a wireless communication link, and a sensor 202, which serves as an information obtaining unit.

Using a wireless communication link, the communication unit 201 connects to the management server 100 via the network 400. Using this wireless communication link, the communication unit 201 may connect to the mobile terminal device 500. The terminal device 200 transmits information obtained by the sensor 202 to the management server 100 via the network 400 with the use of the communication unit 201. When the communication unit 201 connects to the mobile terminal device 500, this information is transmitted from the communication unit 201 to the mobile terminal device 500.

Functional Configuration of Camera Device

Figure 5:
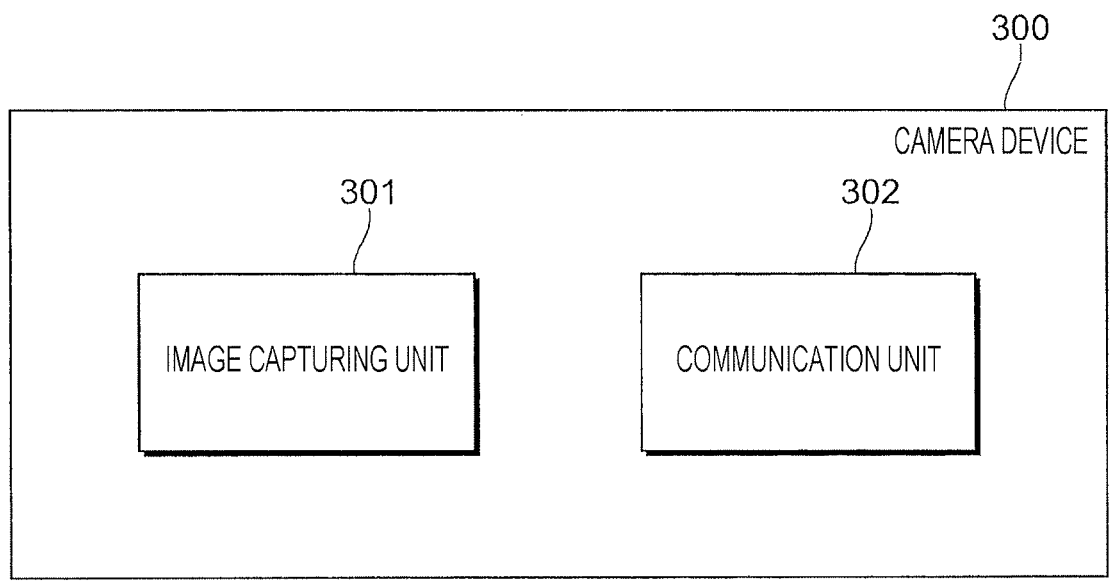
FIG. 5 is a diagram illustrating the functional configuration of a camera device.

FIG. 5 is a diagram illustrating the functional configuration of the camera device 300. As illustrated in FIG. 5, the camera device 300 includes an image capturing unit 301 and a communication unit 302. The image capturing unit 301 includes a lens and an image sensor, and obtains an image as electronic data. The communication unit 302 sends the image, obtained by the image capturing unit 301, to a storage device (not illustrated) which is an external device. The communication unit 302 additionally sends the image to the management server 100 under control of the arrangement information obtaining unit 64 of the management server 100.

Functional Configuration of Mobile Terminal Device

Figure 6:
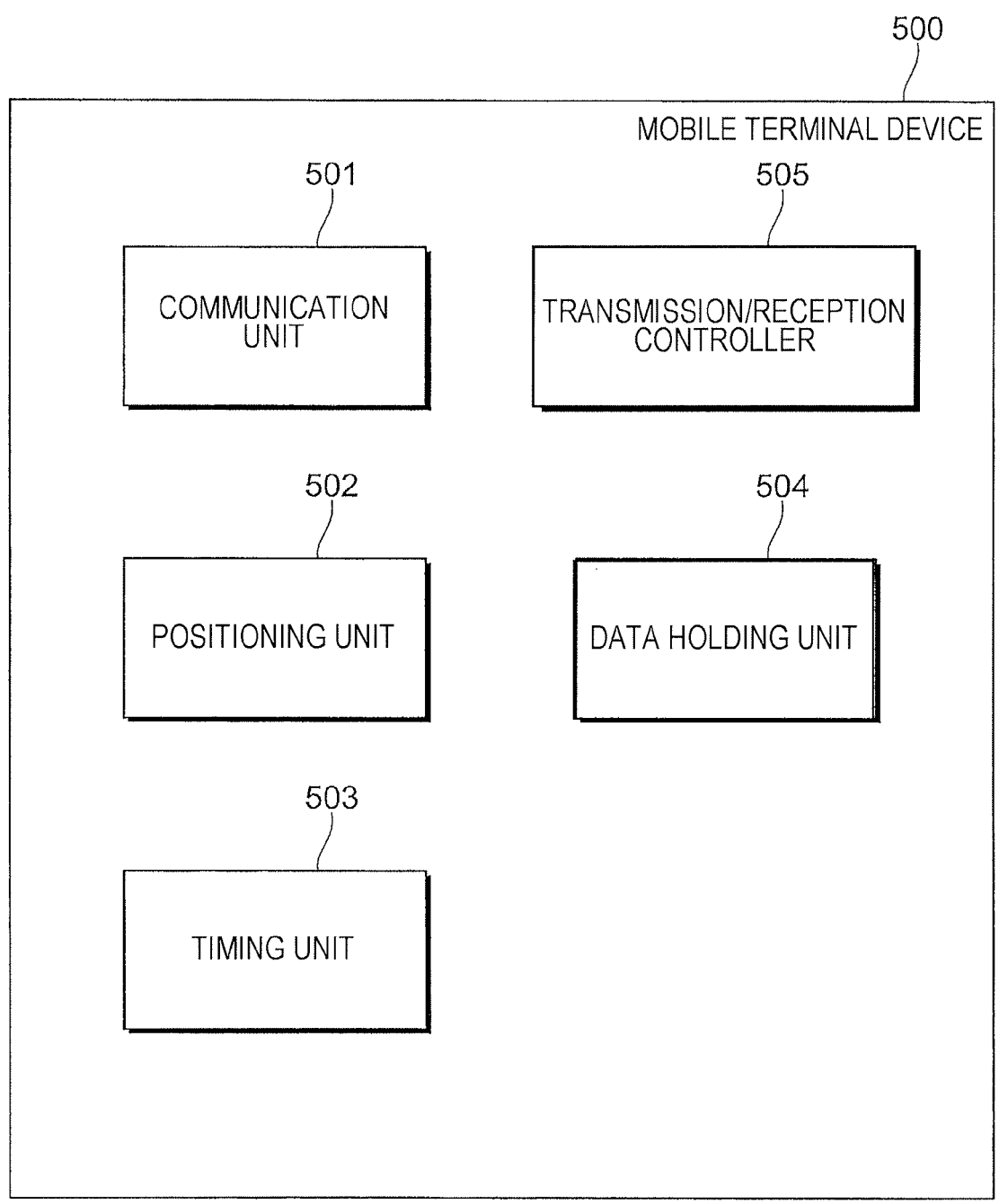
FIG. 6 is a diagram illustrating the functional configuration of a mobile terminal device.

FIG. 6 is a diagram illustrating the functional configuration of the mobile terminal device 500. As illustrated in FIG. 6, the mobile terminal device 500 includes a communication unit 501, a positioning unit 502, a timing unit 503, a data holding unit 504, and a transmission/reception controller 505.

The communication unit 501 connects the management server 100 and the terminal device 200 via a wireless communication link. A link for connecting to the management server 100 may be identical to or different from a link for connecting to the terminal device 200. For example, short-distance wireless communication such as NFC or Bluetooth may be used to establish a connection when communicating with the management server 100, and wireless communication such as Wi-Fi used by the terminal device 100 may be used when communicating with the terminal device 200. In this case, the communication unit 501 is provided with an interface module in accordance with each communication link.

The positioning unit 502 measures the position of the mobile terminal device 500 in a movement area. As the positioning system, existing technology using, for example, Wi-Fi, Bluetooth Low Energy (BLE), geomagnetism, or radio frequency identifier (RFID) may be applied. The timing unit 503 is, for example, an internal clock provided in the mobile terminal device 500, and measures time.

The data holding unit 504 is realized by, for example, semiconductor memory, and holds sensor data of the terminal device 200, received by the communication unit 501 from the terminal device 200. Additionally, the data holding unit 504 holds the position information when the sensor data measured by the positioning unit 502 is received, and the time when the sensor data measured by the timing unit 503 is received in association with the received sensor data.

The transmission/reception controller 505 controls the communication unit 501 to communicate with a specific terminal device 200, and receives sensor data obtained by the terminal device 200. Additionally, the transmission/reception controller 505 controls the communication unit 501 to connect to the management server 100, and transfers the sensor data, which is received from the terminal device 200 and held, to the management server 100. A terminal device 200 from which sensor data is to be collected by the mobile terminal device 500 may be identified by performing authentication processing with the terminal device 200, for example. By giving the authentication information of the terminal device 200 from the management server 100 to the mobile terminal device 500, control may be applied to the terminal device 200 from which sensor data is to be received by the mobile terminal device 500. In the case of establishing a connection using short-distance wireless communication, the mobile terminal device 500 and the management server 100 communicate with each other under control of the transmission/reception controller 505 when the mobile terminal device 500 and the management server 100 become close to each other within a certain distance. Alternatively, communication may be started after authentication processing is performed between the mobile terminal device 500 and the management server 100.

Operation of Management Server

Figure 7A:
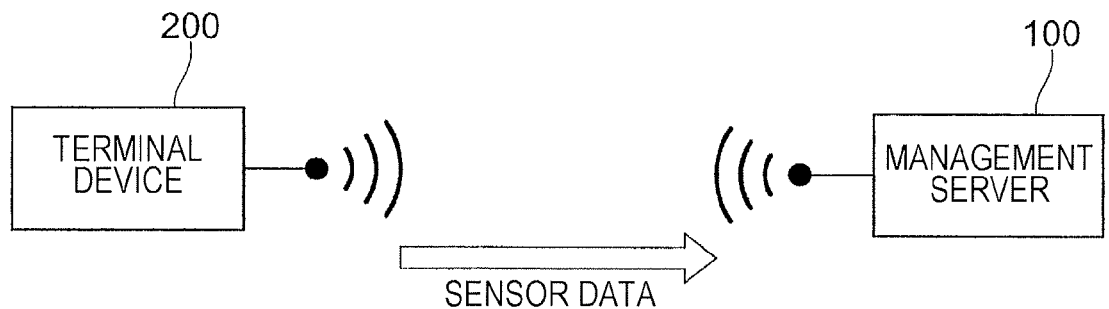
FIGS. 7A and 7B are diagrams illustrating how the management server obtains sensor data from the terminal device, that is.
Figure 7B:
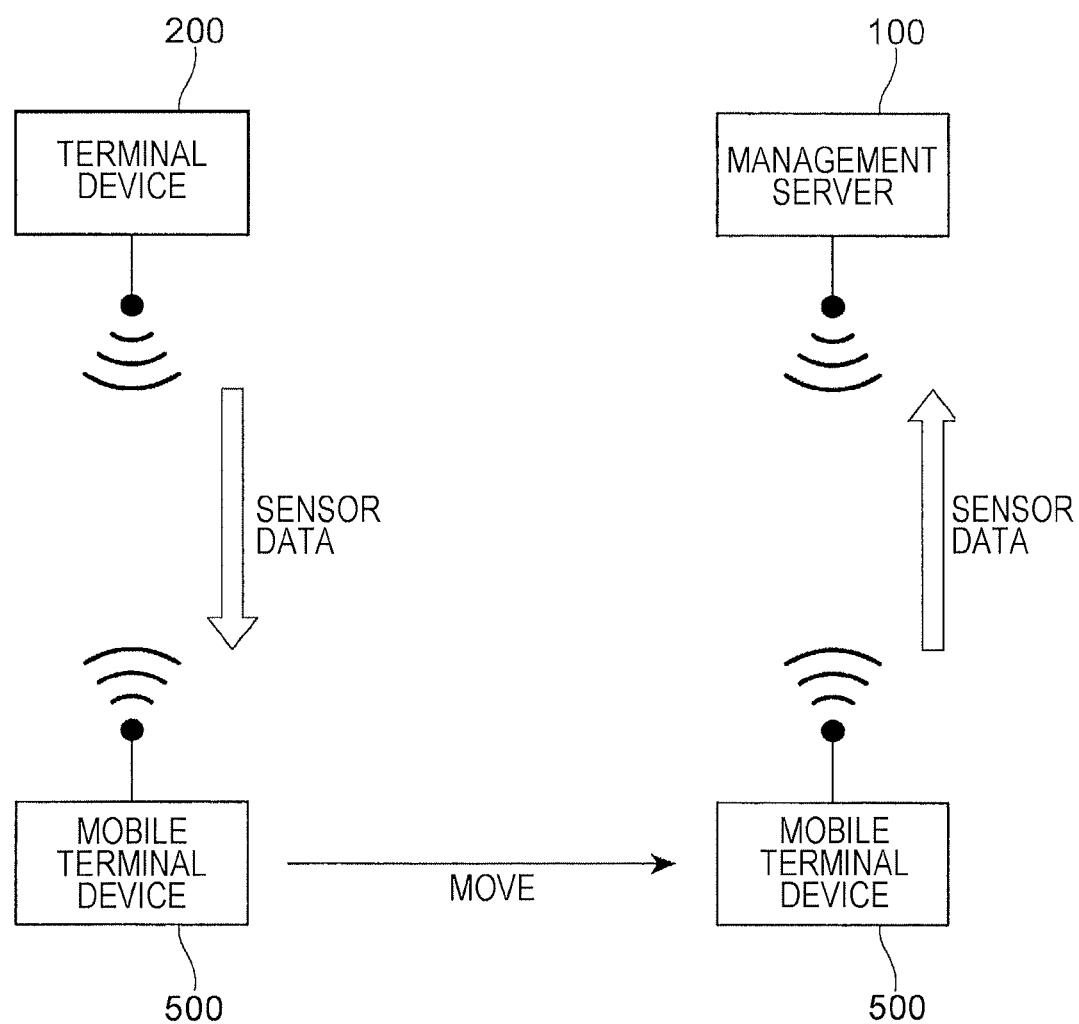

FIGS. 7A and 7B are diagrams illustrating how the management server 100 according to the exemplary embodiment obtains sensor data from the terminal device 200. FIG. 7A illustrates how sensor data is obtained using wireless communication, and FIG. 7B illustrates how sensor data is obtained via the mobile terminal device 500. As illustrated in FIG. 7A, as a normal operation, the management server 100 receives sensor data from the terminal device 200 by performing wireless communication, and holds the sensor data in the memory 105. Here, depending on the arrangement of the terminal device 200, the terminal device 200 may be distant from the management server 100, or there may be a metal cabinet or wall between the management server 100 and the terminal device 200. Accordingly, it may be difficult for the communication unit 110 of the management server 100 to receive radio waves transmitted from the terminal device 200. In such a case, as illustrated in FIG. 7B, sensor data of the terminal device 200 is relayed by the mobile terminal device 500, and then the management server 100 obtains the sensor data. That is, the mobile terminal device 500 receives sensor data from the terminal device 200 when the mobile terminal device 500 moves to a position where it is easy to receive radio waves from the terminal device 200. When the mobile terminal device 500 moves close to the management server 100, the management server 100 receives the sensor data of the terminal device 200 from the mobile terminal device 500. Therefore, the mobile terminal device 500 may collect sensor data only from terminal devices 200 whose sensor data has low timeliness, which is not necessary to be immediately transmitted to the management server 100 after being obtained by the terminal devices 200, and which is only necessary to be collectively obtained, such as once a day.

Disturbance Determination Performed by Management Server

Next, the following case will be discussed in which, regarding a terminal device 200 which is a target from which sensor data is to be obtained by wireless communication, the intensity of radio waves received from the terminal device 200 weakens, and the management server 100 becomes unable to normally receive the sensor data. In this case, the radio wave intensity examination unit 66 of the management server 100 extracts a change pattern of the intensity of received radio waves, and the disturbance determination unit 67 determines the type of disturbance on the basis of the examination result obtained by the radio wave intensity examination unit 66.

Figure 8:
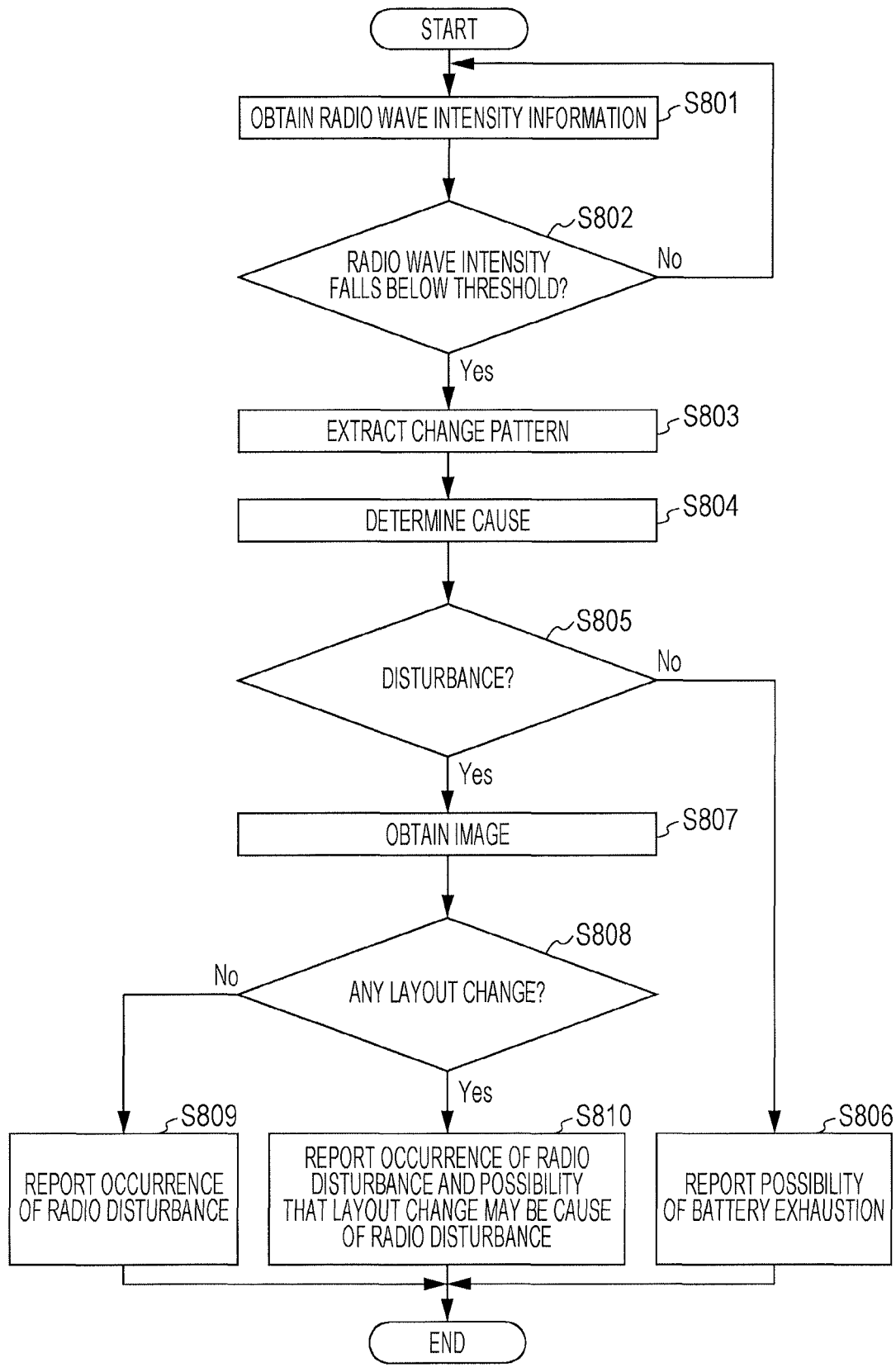
FIG. 8 is a flowchart illustrating a radio disturbance determination process performed by the management server.

FIG. 8 is a flowchart illustrating a radio disturbance determination process performed by the management server 100. As illustrated in FIG. 8, when the management server 100 obtains sensor data from the terminal device 200, the radio wave intensity information obtaining unit 65 obtains information on the intensity of received radio waves from the communication unit 110 (S801). The obtained information on the intensity of received radio waves is accumulated and analyzed by the radio wave intensity examination unit 66. When the intensity of received radio waves falls below a preset threshold, the radio wave intensity examination unit 66 extracts a change pattern of the intensity of received radio waves on the basis of the log of the intensity of received radio waves, which has been accumulated (S802 and S803).

Next, on the basis of the examination result obtained by the radio wave intensity examination unit 66, the disturbance determination unit 67 determines the cause of the change of the intensity of received radio waves (S804). Here, when the intensity of received radio waves weakens over a certain period of time (such as a few days), it is determined that the battery of the terminal device 200 has exhausted. Alternatively, when the intensity of received radio waves suddenly weakens at a certain time point, it is determined that some kind of radio disturbance occurred at that point. When it is determined that the battery has exhausted (NO in step S805), the disturbance determination unit 67 notifies the administrator of the possibility of the battery exhaustion, along with the identification information of the terminal device 200 (S806). Specifically, for example, a message is displayed on the display 107, or a message is sent by email or FAX to the administrator's information terminal. A heat map representing the intensity of radio waves by color may be created over a floor map representing information on the managed area, and may be displayed on the display 107, or such a heat map may be sent by email or FAX.

When it is determined that radio disturbance has occurred (YES in S805), next the disturbance determination unit 67 causes the arrangement information obtaining unit 64 to control the camera device 300 to obtain an image of the managed area (S807). A difference from an image of the same area, which has been obtained before the occurrence of this event where the intensity of received radio waves has changed, is calculated, and whether there has been a layout change in the area is determined. Specifically, for example, it is determined whether there is an item newly installed or removed, or an item whose position is changed. A newly installed item or moved item may include the terminal device 200 itself. When it is determined that there has been no layout change (NO in S808), because the cause of the radio disturbance may not be estimated from information that may be obtained by the disturbance determination unit 67, the disturbance determination unit 67 notifies the administrator of the occurrence of the radio disturbance, and ends the determination process (S809). Like the above-mentioned notification of the battery exhaustion, notification of the radio disturbance is performed by displaying a message on the display 107, or sending a message by email or FAX to the administrator's information terminal. A heat map representing the intensity of radio waves by color may be created over a floor map representing information on the managed area, and may be displayed on the display 107, or such a heat map may be sent by email or FAX.

In contrast, when a layout change is detected (YES in S808), the disturbance determination unit 67 outputs, along with information indicating the layout change, information indicating the occurrence of radio disturbance and the possibility that the pointed-out layout change may be the cause of the radio disturbance (reports to the administrator), and ends the process (S810). Like the above-mentioned notifications, these notifications may be performed by displaying a message on the display 107, or sending a message by email or FAX to the administrator's information terminal. A heat map representing the intensity of radio waves by color and indicating the layout change may be created over a floor map representing information on the managed area, and may be displayed on the display 107, or such a heat map may be sent by email or FAX.

Determination of Other Disturbance

In the above-described exemplary operation, the possibility that, when a layout change in an area of interest is detected, the layout change may be the cause of the radio disturbance is reported. The cause of the radio disturbance may be additionally explored. For example, it may be estimated that radio wave interference is occurring when a new terminal device 200 is installed or an already-installed terminal device 200 is changed to a new position.

Figure 9:
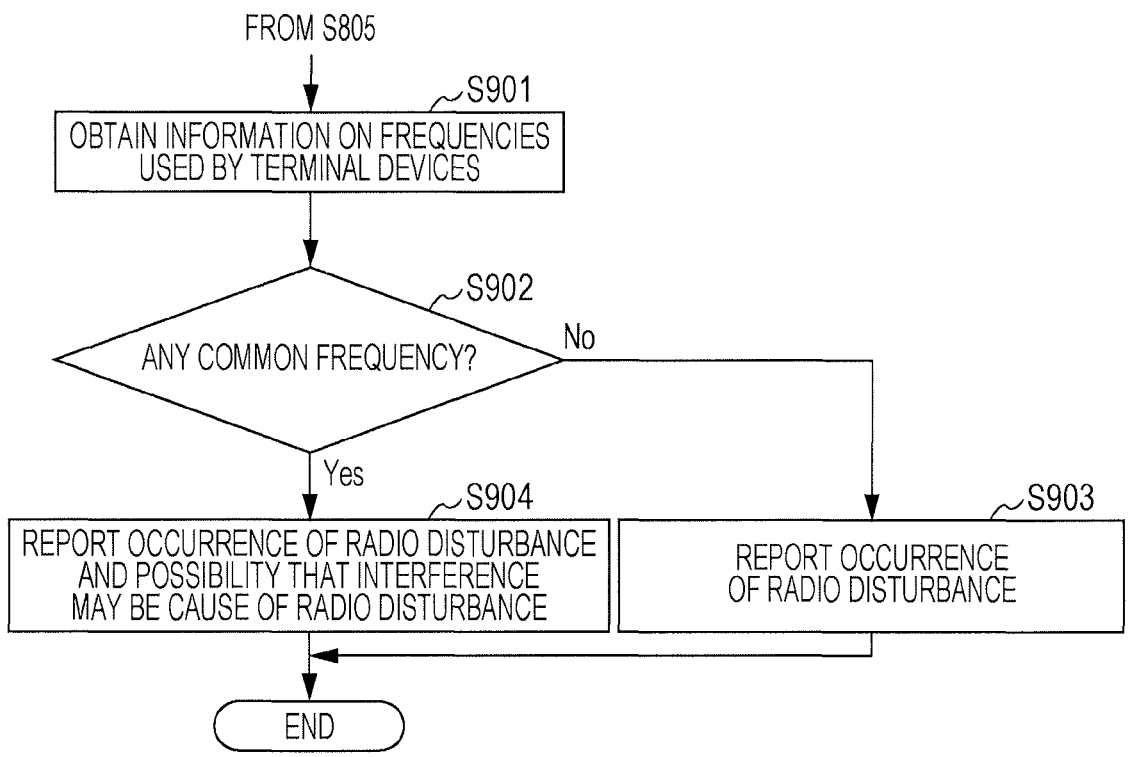
FIG. 9 is a flowchart illustrating a process in the case of estimating whether there is radio wave interference causing radio disturbance.

FIG. 9 is a flowchart illustrating a process in the case of estimating whether there is radio wave interference causing radio disturbance. The process illustrated in FIG. 9 is a process performed after it is determined in step S805 of FIG. 8 that radio disturbance has occurred. Also in this example, it is assumed that the intensity of radio waves received from multiple terminal devices 200 weakens at a certain rate, such as once in several times. Normally, each terminal device 200 transmits radio waves while switching the frequency using a method called "frequency hopping". Therefore, interference occurs when the frequencies of radio waves transmitted by multiple terminal devices 200 are the same, but no interference occurs when different frequencies are used. Therefore, disturbance caused by interference does not occur continuously, but occurs intermittently, such as once in several times.

When it is determined that radio disturbance has occurred on radio waves received from multiple terminal devices 200, next the disturbance determination unit 67 obtains, from the sensor information management unit 61, information on the frequencies of radio waves used by these terminal devices 200 (S901). The disturbance determination unit 67 determines whether the frequencies used by the terminal devices 200 include a common frequency (S902). When it is determined that no common frequency is included (NO in S902), because the cause of the radio disturbance may not be estimated from information that may be obtained by the disturbance determination unit 67, the disturbance determination unit 67 notifies the administrator of the occurrence of the radio disturbance, and ends the determination process (S903). Like the above-mentioned notifications, notification of the radio disturbance may be performed by displaying a message on the display 107, or sending a message by email or FAX to the administrator's information terminal. A heat map representing the intensity of radio waves by color may be created over a floor map representing information on the managed area, and may be displayed on the display 107, or such a heat map may be sent by email or FAX.

In contrast, when the frequencies of radio waves used by the terminal devices 200 include a common frequency (YES in S902), the disturbance determination unit 67 notifies the administrator of information indicating that radio disturbance has occurred, and there is a possibility that interference of radio waves transmitted by the terminal devices 200 may be the cause of the radio disturbance, and ends the process (S904). Like the above-mentioned notifications, the notification may be performed by displaying a message on the display 107, or sending a message by email or FAX to the administrator's information terminal. A heat map representing the intensity of radio waves by color and indicating the positions of terminal devices 200 likely to be the cause of interference may be created over a floor map representing information on the managed area, and may be displayed on the display 107, or such a heat map may be sent by email or FAX.

Modifications

In the above-described exemplary operations, the disturbance determination unit 67 determines whether radio disturbance has occurred, on the basis of the examination result obtained by the radio wave intensity examination unit 66. In addition to this, further information for the determination may be obtained. For example, the disturbance determination unit 67 gives the mobile terminal device 500 the identification information of a terminal device 200 from which radio waves are received and the intensity thereof weakens, and this terminal device 200 serves as a target from which sensor data will be obtained by the mobile terminal device 500. In doing so, when the mobile terminal device 500 is able to obtain the sensor data of the terminal device 200, it is clear that the terminal device 200 itself is operating normally, but radio waves transmitted from the terminal device 200 to the management server 100 are weakened by some obstructions. Therefore, whether radio disturbance has occurred may be determined by considering the obtaining result of sensor data by the mobile terminal device 500.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal management apparatus comprising:
   at least one processor configured to execute:
   a radio wave intensity information obtaining unit that obtains radio wave intensity information indicating intensity of radio waves transmitted from a terminal device being managed;
   a radio wave intensity detection unit that detects a change in intensity of radio waves transmitted from the terminal device, using the radio wave intensity information obtained by the radio wave intensity information obtaining unit; and
   an arrangement information obtaining unit that obtains arrangement information of an item installed indoors, the arrangement information comprising an image; and
   a memory that holds information about the terminal device,
   wherein the at least one processor is configured to execute a disturbance determination unit that determines presence and type of radio disturbance, using a pattern of the change in intensity of radio waves detected by the radio wave intensity detection unit, the arrangement information obtained by the arrangement information obtaining unit, and the information about the terminal device held by the memory,
   wherein the disturbance determination unit determines that no radio disturbance has occurred if the intensity of radio waves of a specific terminal device, detected by the radio wave intensity detection unit, gradually weakens over a predetermined period, and determines that radio disturbance has occurred if the intensity suddenly changes at a certain time point, and wherein, if the disturbance determination unit determines that radio disturbance has occurred, and a change of position of the installed item is detected using the arrangement information obtained by the arrangement information obtaining unit, then the disturbance determination unit outputs information indicating a possibility that the change of position of the installed item may be cause of the radio disturbance.

2. The terminal management apparatus according to claim 1, wherein:

the arrangement information obtaining unit controls an external camera device and obtains a captured image of an area where the terminal device is installed as the arrangement information, and the disturbance determination unit detects a change of position of the installed item using a difference between a plurality of captured images obtained at different time points by the arrangement information obtaining unit.

3. The terminal management apparatus according to claim 1, further comprising:

a display configured to display, using a determination result obtained by the disturbance determination unit, a heat map representing the intensity of radio waves, over a floor map of an area where the terminal device is installed.

4. The terminal management apparatus according to claim 1, wherein the disturbance determination unit obtains information tabout intensity of radio waves of the terminal device, received by a mobile terminal device capable of receiving radio waves transmitted from the terminal device, and determines radio disturbance using a difference between the information about intensity of radio waves and the radio wave intensity information obtained by the radio wave intensity information obtaining unit.

5. A terminal management apparatus comprising:

at least one processor configured to execute:

a radio wave intensity information obtaining unit that obtains radio wave intensity information indicating intensity of radio waves transmitted from a terminal device being managed;

a radio wave intensity detection unit that detects a change in intensity of radio waves transmitted from the terminal device, using the radio wave intensity information obtained by the radio wave intensity information obtaining unit; and an arrangement information obtaining unit that obtains arrangement information of an item installed indoors, the arrangement information comprising an image; and a memory that holds information about the terminal device, wherein the at least one processor is configured to execute a disturbance determination unit that determines presence and type of radio disturbance, using a pattern of the change in intensity of radio waves detected by the radio wave intensity detection unit, the arrangement information obtained by the arrangement information obtaining unit, and the information about the terminal device held by the memory, wherein the disturbance determination unit determines that no radio disturbance has occurred if the intensity of radio waves of a specific terminal device, detected by the radio wave intensity detection unit, gradually weakens over a predetermined period, and determines that radio disturbance has occurred if the intensity suddenly changes at a certain time point, and wherein, if the disturbance determination unit determines that radio disturbance has occurred on a plurality of terminal devices that use radio waves with a same frequency for communication, then the disturbance determination unit outputs information indicating a possibility that radio waves transmitted from the plurality of terminal devices may interfere with each other.

6. A terminal management system comprising:

a sensor terminal configured to obtain data using a sensor; and a terminal management apparatus configured to receive data from the sensor terminal by performing wireless communication, and to manage the sensor terminal, wherein the terminal management apparatus is configured to:

obtain radio wave intensity information indicating intensity of radio waves transmitted from the sensor terminal being managed;

obtain arrangement information of an item installed in an area where the sensor terminal is installed, the arrangement information comprising an image;

determine that there is radio disturbance if there is an abrupt change in intensity of radio waves identified using the radio wave intensity information; and determine type of the radio disturbance using a change of arrangement of the installed item, detected using the arrangement information, and information about radio waves used by the sensor terminal for communication.

7. A terminal management system comprising:

a sensor terminal configured to obtain data using a sensor; and a terminal management apparatus configured to receive data from the sensor terminal by performing wireless communication, and to manage the sensor terminal, wherein the terminal management apparatus is configured to:

obtain radio wave intensity information indicating intensity of radio waves transmitted from the sensor terminal being managed;

obtain arrangement information of an item installed in an area where the sensor terminal is installed, the arrangement information comprising an image;

determine that there is radio disturbance if there is an abrupt change in intensity of radio waves identified using the radio wave intensity information; and determine type of the radio disturbance using a change of arrangement of the installed item, detected using the arrangement information, and information about radio waves used by the sensor terminal for communication;

wherein the terminal management system further comprises a mobile terminal device configured to receive radio waves transmitted from the sensor terminal, and wherein the terminal management apparatus is configured to obtain data of the sensor terminal, received by the mobile terminal device, if the terminal management apparatus is unable to obtain data normally from radio waves transmitted from the sensor terminal.

* * * * *